United States Patent [19]

Gaber et al.

[11] Patent Number: 4,856,718

[45] Date of Patent: Aug. 15, 1989

[54] FOOD PROCESSOR AND FOOD CUTTING DEVICES THEREFOR

[75] Inventors: Ira Gaber, West Norwalk, Conn.; Cooper C. Woodring, Plandone, N.Y.

[73] Assignee: Better Mousetraps Inc., Plandone, N.Y.

[21] Appl. No.: 128,689

[22] Filed: Dec. 4, 1987

[51] Int. Cl.⁴ .............................................. A47J 43/25
[52] U.S. Cl. ................................... 241/93; 241/169.1; 241/273.1
[58] Field of Search ....................... 241/168, 169.1, 93, 241/92, 101.2, 91, 273.1, 273.2, 273.3, 273.4, 101.4; 30/272 A, 276, 289; 206/373, 238, 379–383, 486–489; 99/623, 537

[56] References Cited

U.S. PATENT DOCUMENTS

| | | |
|---|---|---|
| 225,681 | 3/1880 | Boerstler ............................. 241/93 |
| D. 249,440 | 9/1978 | Doyel . |
| 839,239 | 12/1906 | Wagner ............................... 241/93 |
| 1,373,135 | 3/1921 | Kendrek ............................. 241/93 |
| 1,538,609 | 5/1925 | Barnett ............................ 241/273.1 |
| 1,840,400 | 1/1932 | Lebherz . |
| 2,128,792 | 8/1938 | Berarducci . |
| 2,145,421 | 1/1939 | Jungbecker . |
| 2,228,025 | 1/1941 | Apfelbeck . |
| 2,271,175 | 1/1942 | Mantelet . |
| 2,352,122 | 6/1944 | Richardson . |
| 2,596,604 | 5/1952 | Schaeffer . |
| 2,704,095 | 3/1955 | Sponla ................................. 241/93 |
| 2,713,367 | 7/1955 | Aberer . |
| 2,958,355 | 11/1960 | Young . |
| 3,137,333 | 4/1963 | Nishina . |
| 3,335,772 | 8/1967 | Menge . |
| 3,359,637 | 12/1967 | Hansen . |
| 3,365,963 | 1/1968 | Happe . |
| 3,473,587 | 10/1969 | Nishimura ........................ 241/101.4 |
| 3,491,819 | 2/1968 | Sawrenko . |
| 3,563,290 | 2/1971 | Bricker . |
| 3,605,842 | 9/1971 | Kuri . |
| 3,635,270 | 1/1972 | Petroske et al. . |
| 3,675,886 | 7/1972 | Kampmier . |
| 3,832,776 | 9/1974 | Sawyer . |
| 3,907,215 | 9/1975 | Mantelet . |
| 3,912,176 | 10/1975 | Mantelet . |
| 3,952,239 | 4/1976 | Owings . |
| 4,016,802 | 4/1977 | O'Connell . |
| 4,062,262 | 12/1977 | Odell . |
| 4,073,056 | 2/1978 | Schaeffer et al. . |
| 4,081,145 | 3/1978 | Moe et al. . |
| 4,084,123 | 4/1978 | Lineback et al. . |
| 4,178,683 | 12/1979 | Bettcher . |
| 4,211,002 | 7/1980 | Kirk . |
| 4,214,714 | 7/1980 | Graham ................................ 241/93 |
| 4,227,656 | 10/1980 | Engebretsen . |
| 4,309,823 | 1/1982 | Antolino et al. . |
| 4,386,740 | 6/1983 | Van Deursen . |
| 4,390,133 | 6/1983 | Wanat . |
| 4,509,698 | 4/1985 | David . |
| 4,616,169 | 10/1986 | Proffitt . |
| 4,622,749 | 11/1986 | Inagaki . |
| 4,685,625 | 8/1987 | Mazza ......................... 241/169.1 X |
| 4,733,827 | 3/1988 | Williams ......................... 241/101.2 |

FOREIGN PATENT DOCUMENTS

| | | | |
|---|---|---|---|
| 2249585 | 8/1973 | Fed. Rep. of Germany ........ 241/93 |
| 2715956 | 10/1978 | Fed. Rep. of Germany ........ 241/93 |
| 2814272 | 10/1979 | Fed. Rep. of Germany ...... 241/168 |
| 13390 | of 1900 | United Kingdom ................. 241/93 |
| 510431 | 8/1939 | United Kingdom ................. 241/93 |
| 651920 | 4/1951 | United Kingdom ................. 241/93 |

*Primary Examiner*—Mark Rosenbaum
*Attorney, Agent, or Firm*—Hedman, Gibson, Costigan & Hoare

[57] ABSTRACT

A hand-holdable food processor for cutting, slicing, shredding or grating vegetables, fruit, cheese and the like. The food processor is operable in various orientations while being held by hand and has a power supply, food cutting means for cutting, slicing, shredding or grating operatively engaging the power supply and a food delivery means extending from the processor for momentary storage and feeding of food to the food cutting means. A food cutting device also is disclosed which includes one or more blade sections eccentrically positioned about the axis of a food processor.

21 Claims, 11 Drawing Sheets

FOOD PROCESSOR AND FOOD CUTTING DEVICES THEREFOR

FIELD OF THE INVENTION

The present invention is generally directed to food processors and particularly to a novel hand-held food processor for cutting, slicing, shredding or grating of food, such as vegetables, fruits and cheeses containing novel foodcutting devices and to a consumer and/or commercial product containing the same.

BACKGROUND OF THE INVENTION

In many households, the use of knives and graters to cut, slice, grate and shred food has become obsolete over the last 15 years. Full-size food processors have provided a viable alternative to manual food preparation. Food processors have been an effective means of reducing the time needed to perform such foodcutting operations.

However, full size processors have fallen out of favor with consumers for several reasons. They are complicated, combersome, difficult to clean and, as a result, the full-size food processor has been relegated to infrequent use.

More recently, so-called mini-processors have been developed to overcome the deficiencies of their predecessors and to reclaim the shrinking food processor market. Such devices have been scaled down in size and reduced in cost. While they are somewhat easier to use, and less cumbersome, they are not substantially easier to set-up or clean and have therefore not satisfied the needs of the marketplace.

Of critical importance to the enduring success of a food processor is that it must possess the simplicity, convenience and stand-by readiness of a knife along with the speed, accuracy and versatility of a multi-purpose cutter. In addition, it must be easier to store and easier to clean than ordinary food processors.

Applicants have developed a food processor which can readily be held in the hand and moved to any desired location in an efficient manner. In addition, the food processor, in a preferred form of the invention, has a self-contained power supply that makes it portable. The food processor of the present invention includes novel cutting blade assemblies which make accurate cuts of food and are easy to load and clean.

It is therefore an object of the invention to provide a hand-held food processor which is easy to operate and easy to use and clean.

It is another object of the preferred form of the invention to provide a food processor which has a self-contained power source and which is therefore not dependent on being connected to an electrical outlet during operation.

It is a further object of the invention to provide novel cutting devices which are easily inserted into the food processor and which efficiently cut and eject food from the food processor.

It is a still further object of the invention to provide a consumer kit containing the food processor and cutting devices in a surface mountable storage unit.

SUMMARY OF THE INVENTION

The present invention is directed to a hand-held food processor for cutting, slicing, shredding or grating of food, such as vegetables, fruits and cheeses which includes a power supply means which is preferably contained solely within the food processor to enable operation without having the food processor attached to an electrical outlet during operation.

The food processor also includes a food cutting means which is operatively connected to the power supply means and a food delivery means which is operatively connected to the food cutting means for conveying uncut food to the food cutting means.

In a preferred form of the invention, the food cutting means has an arcuate cross-sectional shape which is at least partially rotatable in at least one direction about an axis. It includes at least one arcuate blade section positioned about the axis of rotation. In a preferred form of the invention, there are provided at least two arcuate blade sections eccentrically positioned about the axis of rotation.

Each blade section has a guiding or non-cutting edge and a cutting edge such that the guiding edge of one blade section and the cutting edge of a contiguous blade section define a cutting zone.

The guiding edge acts to position the food to be cut and is spaced apart from the corresponding cutting edge of the cutting zone a distance which corresponds to the thickness of the desired cut.

The unique geometry of the blade section, especially the cutting edge, allows the cut or excised portion of the food product to easily move along the arcuate interior surface of the cutting edge blade section during rotation of the cutting device. As a result, the cutting edge is easily able to slide entirely through the food product without fracturing or splitting the food product.

The food processor also includes food delivery means which is preferably in the form of a tube or chute which can be easily loaded with food to be cut at a location remote from the cutting edge. Preferably the food containing means are retained in a correspondingly shaped portion of the food processor and preferably movable collar means are provided which facilitate releasably retaining the food cutting means in the food processor.

The food processor kit of the present invention includes a surface-mountable (e.g. wall mountable) case which comprises a first section for housing the food processor and a second, adjacent section for housing at least one cutting device which is removably insertable into the food processor. The typical food processor kit may include a plurality of cutting devices for cutting thin slices, thick slices and crinkle cuts (e.g. for french fries), section cut slices, as well as cutting devices which grate and shred. The kit is provided with spaced-apart cavities for housing the respective cutting devices in the second section.

The kit is also provided with a lid hinged at one end for covering the second section. The inside surface of the lid may be provided with at least one food preparation means adapted to divide a bulky food, such as a potato, into smaller portions which are readily insertable into the food delivery section of the food processor.

In a preferred form of the invention, the food preparation means comprises a frame and an array of cutting edges connected between portions of the frame. The cutting edges define a plurality of open-ended chambers. When the cutting edges are forced against the bulky food product or vice versa, the food product is divided into sections which move through the open-ended chambers creating a plurality of elongated food portions of a desired cross-sectional dimension which can then be inserted into the food delivery means.

In operation, the food processor is removed from the kit and a suitable cutting means (slicer, grate, etc) inserted into the food cutting chamber. The cutter is secured in place preferably by a collar means releasably secured to the front end of the chamberr remote from the end of the chamber in which the cutting means is releasably secured to the rotation means of the motor.

A bulky food product such as a carrot is inserted into the food delivery means and then the food processor is actuated by depressing a momentary switch on the housing or vice versa. The carrot is cut and ejected out of the opening in the front end of the chamber into a bowl, receptacle, or onto a surface as desired.

BRIEF DESCRIPTION OF THE DRAWINGS

The folowing drawings in which like reference characters indicate like parts are illustrative of embodiments of the invention and are not intended to limit the invention as encompassed by the claims of the application.

DETAILED DESCRIPTION OF THE INVENTION

Figure 1:
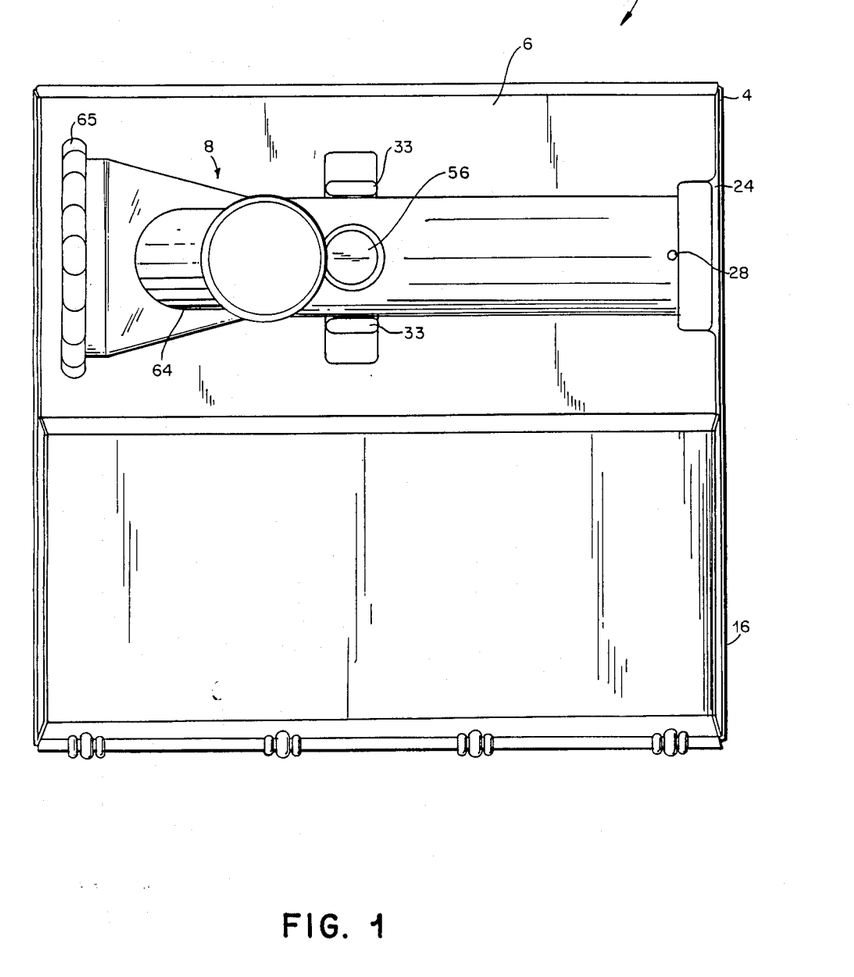
FIG. 1 is a top plan view of the food processor kit showing the food processor in the first section and a lid in the closed position covering the second section.
Figure 2:
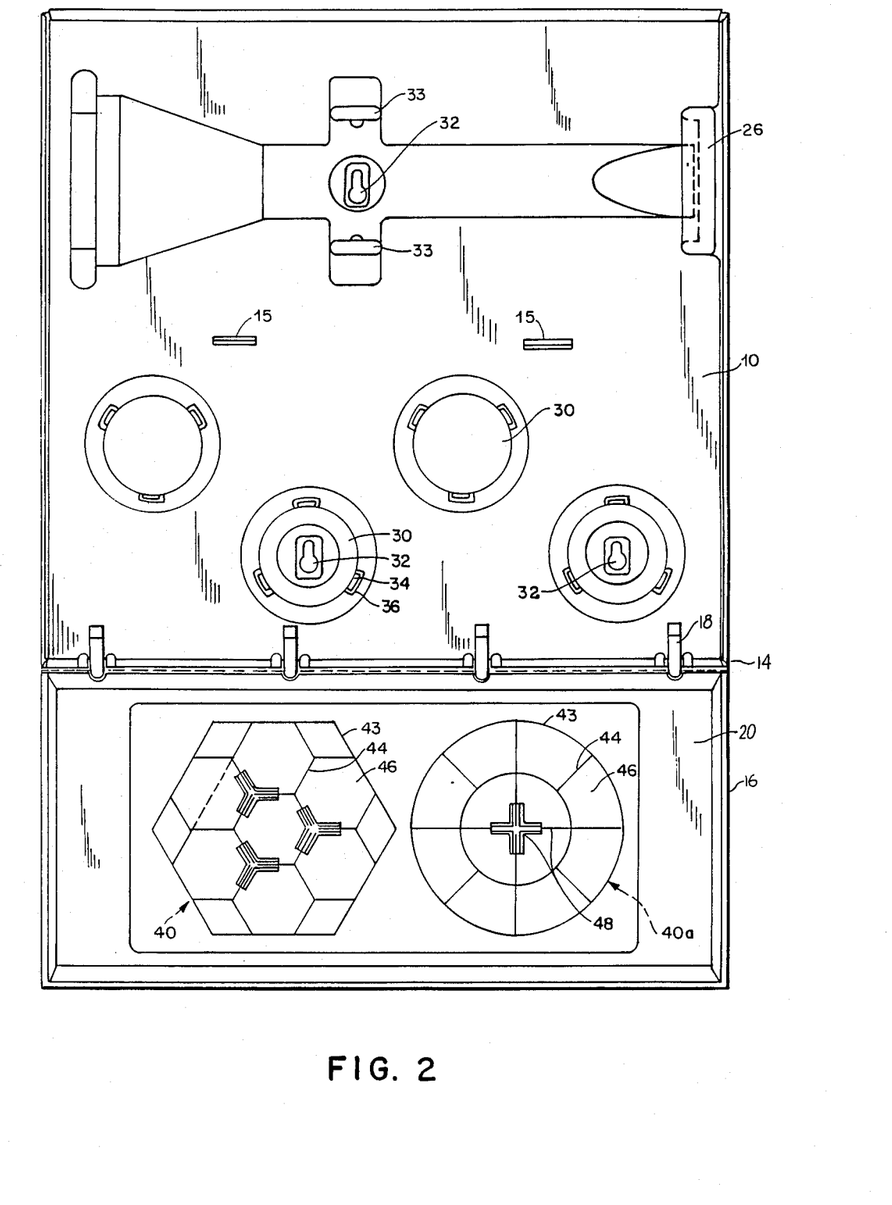
FIG. 2 is a top plan view of the food processor kit of FIG. 1 showing the lid in the open position exposing the second section for housing the cutting devices and showing food preparation devices on the interior surface of the lid.
Figure 3:
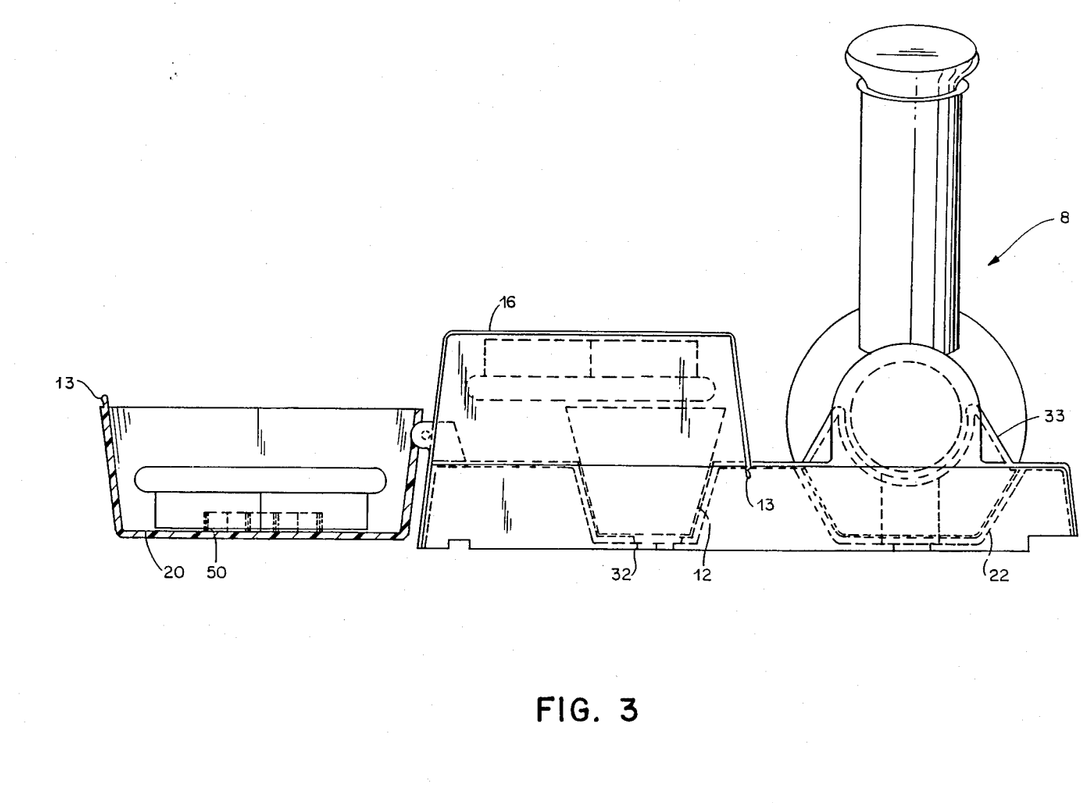
FIG. 3 is a side view of the food processor kit shown in FIG. 2.

Referring to the drawings and first to FIGS. 1-3, the food processor kit 2 of the present invention includes a case 4 having a first section 6 for housing a food processor 8 and a second section 10 for storing at least one cutting device 12 which also constitutes part of the present invention.

The case 4 has attached at one end 14 a lid 16 by hinges 18 or other conventional attachment means. The lid 16 is movable from a closed position shown in FIG. 1, covering the second section 10 of the case 4, to an open position shown in FIG. 2 exposing the second section 10 and the interior surface 20 of the lid 16. The lid 16 may be secured in the closed position by press fitting a pair of projections 13 into corresponding slots 15.

The case 4 may be provided with openings 32 for mounting the case 4 on a flat surface such as a wall. When the case 4 is opened and the lid 16 is moved to expose the second section 10, the wall-mounted case 4 will have the appearance shown in FIG. 2.

The food processor 8 is stored in the first section 6 of the case 4 within a cavity 22 shown in FIG. 3. The food processor 8 is held in the cavity 22 by a conventional bracket 24 and by a conventional bracket 33. The bracket 24 may be provided with conventional contacts 26 and an outlet mounted transformer (not shown) to recharge the batteries to provide for the recharging of the power supply unit. In addition, there may be provided an L.E.D. 28 for indicating when the food processor 8 is in the recharging mode.

The second section 10 of the case 4 may be provided with at least one cavity 30 for storing the cutting devices 12. The cavities 30 have a shape complimentary to the shape of the cutting device 12, as for example, a conical shape as shown in FIG. 3. Each cavity 30 may be provided with a plurality of projections 34 and slots 36 for securing a corresponding portion of the frame 42 of the cutting devices 12.

The interior surface 20 of the lid 16 is adapted to store at least one food preparation device 40 which is employed to reduce the width of uncut foods into portions which are readily insertable into the food delivery means of the food processor 8.

The food preparation device 40 shown in FIG. 2 is readily suited for sectioning bulky foods that are relatively stable on a flat surface such as a table (e.g. a potato). The device 40a is particularly suited for bulky foods that tend to move or are unstable on a flat surface (e.g. a cucumber). The devices 40 and 40a include a frame 43 and an array of cutting edges 44 which form a plurality of open-ended chambers 46. Each of the chambers 46 has a maximum cross-sectional dimension less than the cross-sectional dimension of the interior surface of the food delivery means. The food preparation device 40a is preferably provided with centrally positioned cutting edges 48 which may be larger than the cutting edges 44.

In operation, the food preparation device 40 is placed upon a bulky food product which is stable on a flat surface (e.g. a potato) and forced downward so that the cutting edges 44 make a complete cut through the potato dividing the potato into a plurality of elongated spears corresponding to the shape of the chambers 46.

The device 40a is used for bulky foods which are unstable on a flat surface (e.g. a cucumber). The cucumber is placed upon the sharpened edges of the device 40a and forced downward so that one end of the cucumber is partially cut and engaged by the centrally positioned cutting edges 48. The device 40a is then turned over and pressed downward until the cutting edges 44 and 48 cut entirely through the cucumber producing a plurality of spears.

Each of the spears produced by the devices 40 and 40a has a maximum cross-sectional dimension less than the cross-sectional interior dimension of the food delivery means of the food processor 8. The spears are then ready to be inserted into the food delivery means and cut, sliced, grated or shred depending on the particular cutting device 12 which is inserted and secured within the food processor 8.

The food preparation devices 40 and 40a are held in the lid 16 by conventional brackets 50 as shown in FIG. 3.

Figure 4:
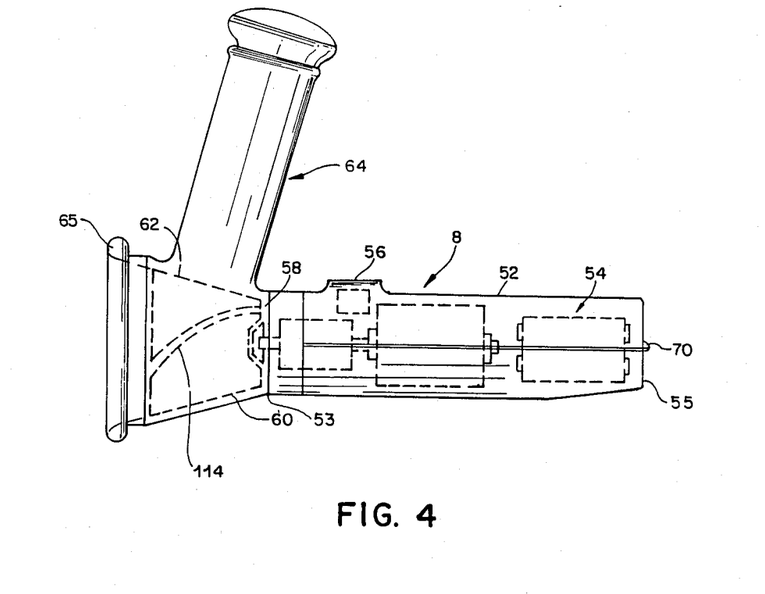
FIG. 4 is a side view of the food processor of the invention ready for use with a schematic representation of the power supply means and cutting means.
Figure 5:
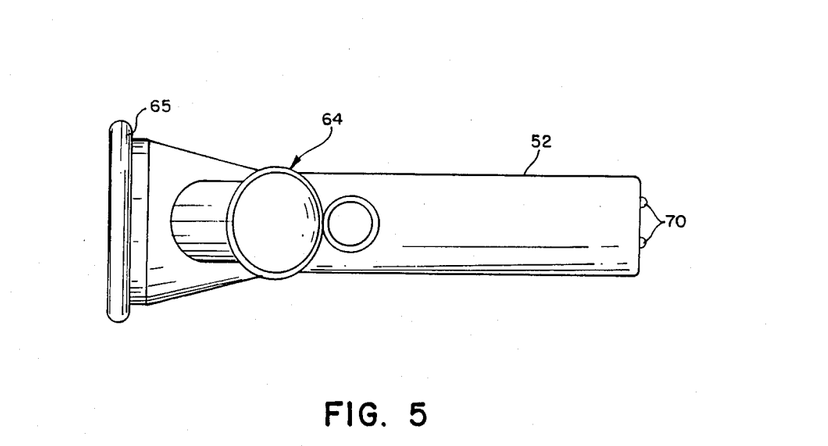
FIG. 5 is a top plan view of the food processor shown in FIG. 4.

Referring to FIGS. 4–6A, the food processor 8 of the present invention includes a substantially cylindrical housing 52 which is adapted to be comfortably held by the hand of the user. The housing 52 encases a power supply means 54 which is operated by a switch 56 (e.g. a momentary switch). One end 53 of the housing 52 opens into the rear end 58 of a food cutting chamber 60 in which is secured one of the cutting devices 12 having one or more cutting edges 114 as shown in FIG. 4.

The chamber 60 is conical in cross section and tapers outwardly, and has an opening 62 intermediate its end for receiving uncut food through a food deliver means 64. Rotation of the correspondingly conically shaped cutting device 12 within the chamber 60, as illustrated in FIG. 4, causes each cutting edge 114 of the device 12, as hereinafter more fully explained, to completely cut through a portion of the uncut food to produce the desired slices, cuts, etc. The slices of food exit out of the larger open end 66 of the chamber 60. The cutting device 12 is secured within the chamber 60 by a collar 65 which is removably attached to the food processor 8 at the end of the chamber 66.

The food processor 8 has a power supply means 54 which preferably operates on rechargeable batteries. The rechargeable or so-called "cordless" embodiment of the invention enables the user to operate the food processor 8 in any desired location without interference from a permanent electrical outlet cord. However, the present invention is also readily adaptable to the use of a permanent outlet cord.

Figures 6, 6A:
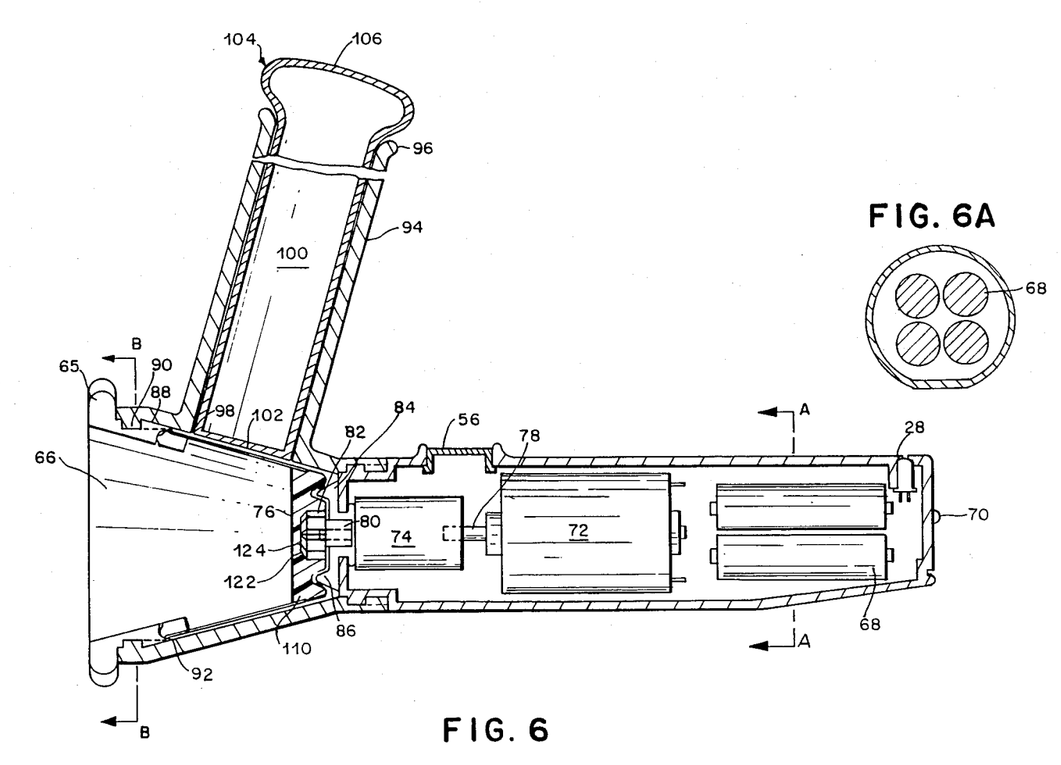
FIG. 6 is a detailed cross-sectional view of the food processor shown in FIG. 4.
FIG. 6A is a cross-sectional view taken through line A—A of FIG. 6.

As shown in FIGS. 6 and 6A, the cordless embodiment has a power supply means 54 which includes rechargeable batteries 68, recharging contacts 70, a motor 72, a gear reduction device 74 and a drive gear means 76 which is adapted to engage and rotate the cutting device 12 within the chamber 60.

The batteries 68 are the standard rechargeable type (e.g. AA standard charge rated 0.5 A/hr) each having a voltage rating of, for example, 1.2 volts. Typically four such batteries 68 are employed. The rear of the housing 55 is provided with an L.E.D. contact 28 which provides a conductive bridge between the recharge contacts 70 and the batteries 68 when the batteries 68 are being recharged in the case 4 through charge terminals 26 and transformer (not shown).

The batteries 68 are connected to the motor 72 which rotates a spindle 78. The motor 72 converts electrical power into a mechanical force for rotating the cutting device 12 via a spindle 80. The motor 72 may be selected from standard motors such as, for example, a Johnson HC 610 G/6337. The speed at which the spindle 80 rotates in most cases is reduced by a planetary gear reducer 74, typically having a 33:1 reduction capacity. The gear reducer 74 has the spindle 80 connected to a hub 82 which is adapted to removably attach to the rear end of the cutting device 12 as seen in FIG. 6.

The power supply means 54 can be adapted to provide a clockwise or counterclockwise rotational movement, or an oscillating or reciprocating linear movement through the use, for example, of a cam means (not shown) positioned between the gear reducer 74 and the cutting device 12.

Figure 10:
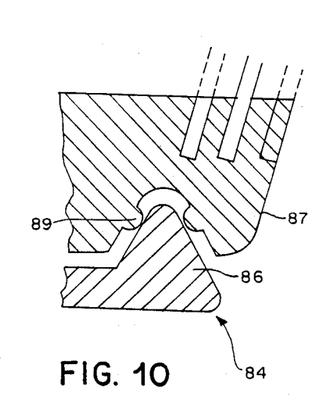
FIG. 10 is an enlarged cross-sectional view of the means of bearing the cutting device against the power supply means.

Between the gear reducer 74 and the cutting device 12 and positioned in the rear end 58 of the chamber 60 is a bearing means 84 for locating one end of the cutting device 12 in the chamber 60 and which also acts as a water resistant seal for the power supply means 54. As shown in FIGS. 6 and 10, the bearing means 84 has an extension 86 which allows the end 87 of the cutting device 12 to be aligned in place via projections 89.

Figure 7:
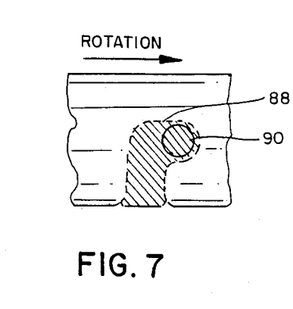
FIG. 7 is a plan view of one bayonet attachment device for attaching the collar to the food cutting chamber shown in FIG. 6B.

The collar 65 in the illustrative embodiment is releasably secured within the opposed open end 66 of the chamber 60. The collar 65 has at least one notch 88 which is removably engaged by a corresponding projection 90 on the inner surface of the chamber 60. The collar 65 can therefore be easily press-fitted into place about the open end 66 of the chamber 60 by inserting the projection 90 into the notch 88 and rotating the collar as shown in FIG. 7. The collar 65 is prevented from being loosened by the rotation of the cutting device 12.

Figure 6B:
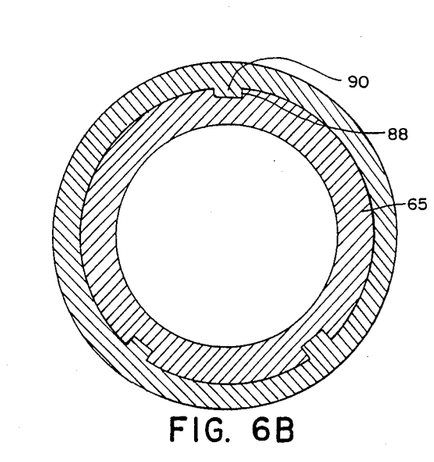
FIG. 6B is a cross-sectional view taken through line B—B of FIG. 6.

As shown in FIG. 6B, a preferred embodiment of the invention employs three notch 88/projection 90 pairs, the first located at the top of the open end 66 of the chamber 60 and the second and third pairs spaced around the periphery of the open end 66. The distance between the first pair and either of the second and third pairs being dimensioned differently than the distance between the second and third pairs of notches 88/projections 90. This arrangement is preferred so that the collar 65 is always in proper orientation when placed over the open end 66 of the chamber 60.

Figure 8:
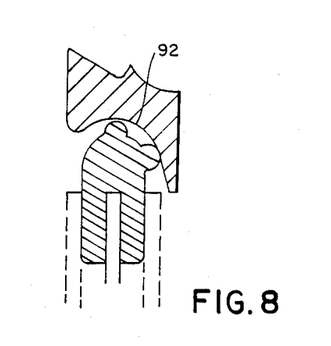
FIG. 8 is an enlarged cross-sectional view of the bearing means between the collar and cutting device.

The collar 65 is also provided with a curvilinear bearing face 92 which serves to locate the collar 65 against the cutting device 12 while allowing the cutting device 12 to freely rotate during cutting operations. As shown in FIG. 8 the bearing face 92 has a curvilinear cross-section which provides a fixed position and guidance for the end of the cutting device 12.

The food delivery means 64 as shown best in FIG. 6 includes an open ended tube or chute 94 rigidly affixed to the food cutting chamber 60. The angle of the chute 94 with respect to the surface of the cutting device 12 may be more or less than 90° but is preferably about 90° for most cutting applications. Preferably the length of the chute 94 exceeds the length of the fingers for safety reasons. The chute 94 has a top open end 96 and a bottom open end 98 which provides a pathway for movement of uncut food into the food cutting chamber 60. By the practice of this invention described herein, food is pulled downward by the arcuate blade construction and conically shaped curling device 12 resulting in a self feeding of the food into the chamber 60. Food which does not readily move down the chute 94 may be urged downward by exerting pressure thereon with a plunger 100. The plunger 100 has a cross-sectional dimension slightly less than the interior cross-sectional dimension of the cute 94 so that its movement within the chute 94 is unimpeded.

The plunger 100 has a flat bottom end 102 which contacts and forces the uncut food downward into the food cutting chamber 60. The opposed end 104 of the plunger 100 is provided with a suitable hand gripping surface 106.

Referring to FIGS. 6, 9, and 12A-12E, the cutting device 12 constituting a part of the present invention, preferably includes a frame 42 comprising opposed frame sections 108 and 110 having attached therebetween at least one blade section 112 which is either integral or mounted to the frame sections 108 and 110 in a customary manner. The frame sections 108 and 110 can be made out of rigid plastic or can be made of stainless steel as with the blade section 112. In the latter embodiment the cutting device 12 can be made as a single piece construction. As illustrated the cutting device 12 is conical in cross section and tapered outwardly from the frame section 108 to the frame section 110.

Figure 9:
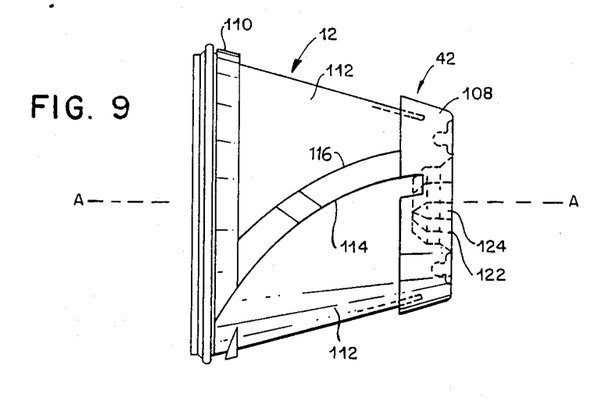
FIG. 9 is a side view of the cutting device with a schematic representation of the means by which the cutting device is connected to the rotation means of the power supply means.

The cutting device 12 is rotatable within the chamber 60 and about a central axis A as shown in FIG. 9 by engagement with and the movement of the hub 82. In a preferred form of the invention, a plurality of blade sections 112 are employed. Each blade section 112 has a cutting edge 114 and a remote guiding edge 116. Each blade section 112 is, preferably, eccentrically positioned about the axis A of rotation such that the guiding edge 116 of one blade section 112 and the cutting edge 114 of a contiguous blade section define a cutting zone 118 where the uncut food from the chute 94 is cut and falls into the chamber 60. As illustrated the blade sections 112 and 114 extend between and the excised preferably to the frame sections 108 and 110.

Figures 12A, 12B, 12C, 12D:
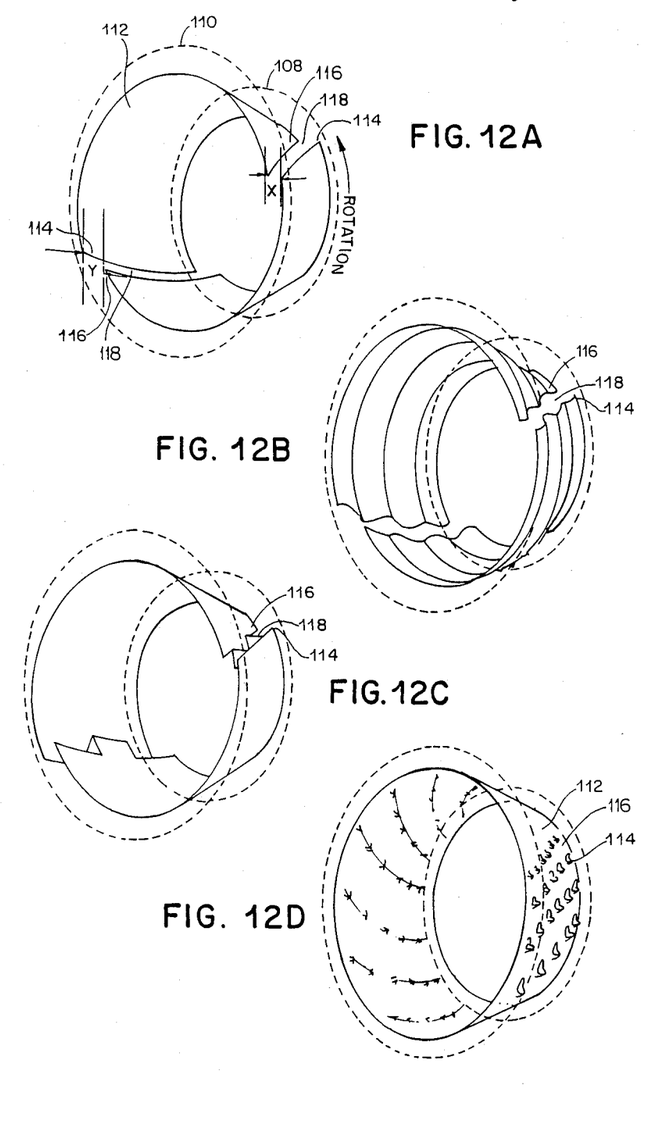
FIGS. 12A-12E are respective views of embodiments of the cutting devices of the present invention.

As shown in FIG. 12A the depth of cut is determined by distance "X" between the cutting edge 114 and the guiding edge 116 comprising the cutting zone 118.

As shown best in FIGS. 6 and 9 the rear frame section 108 of the cutting device 12 has a cavity 120 having a shape complimentary to the shape of hub 82. The cavity contains slots 122 which are placed between radially extending projections 124 of the hub 82 so that rotation of the hub 82 causes the cutting device 12 to rotate about axis A.

The distance "X" may be chosen in accordance with the thickness of any desired cut typically in the range of about 5 millimeters for thick slices and 2 millimeters for thin slices.

As shown specifically in FIG. 12A the cutting device 12 may be provided with cutting zones 118 capable of cutting different thicknesses. For example, the distance of X may be set at five millimeters to cut thick slices and the distance "Y" may be set at two millimeters for thin slices to produce alternating thick and thin slices.

Figure 12E:
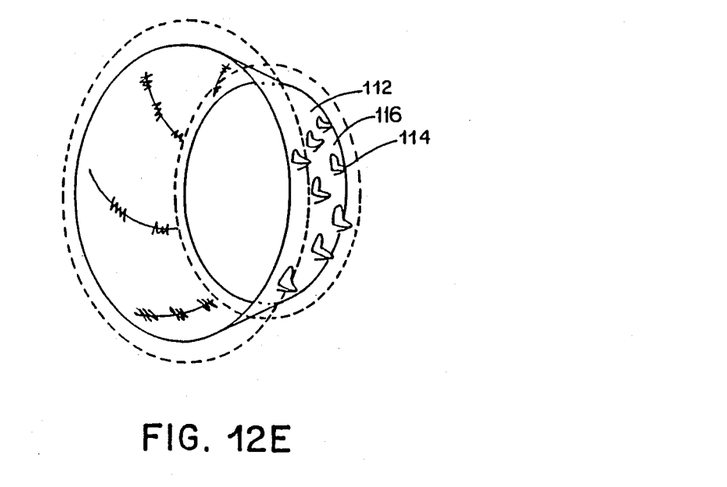

As shown in FIG. 12B, the cutting edges 114 may be of irregular shape to produce decorative slices such as crinkle cuts. FIG. 12C shows a plurality of vertical slices of food product passing through cutting zone 118 to provide, for example, french fries. FIGS. 12D and 12E shown single blade sections 112 for grating and shredding, respectively.

The cutting devices 12 shown in FIGS. 12A-12C offer significant advantages over cutters customarily used for food processors. The unique geometry of the cutting devices 12 and particularly the smooth arcuate surface in the region proximate to the cutting edge 114 enables the blade section 112 to cut completely through the food without fracturing or splitting the uncut product.

Figure 13A:
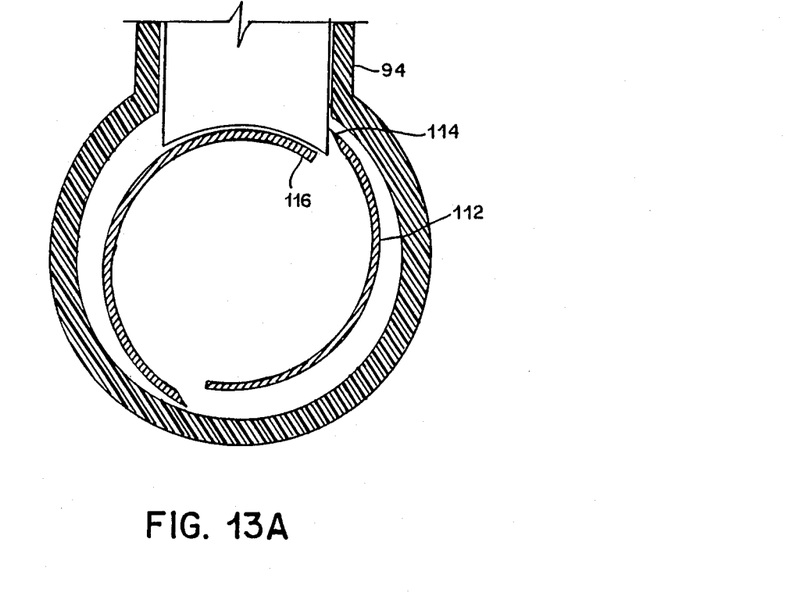
FIGS. 13A-13C are cross-sectional views showing in sequence how a food product is sliced using the cutting device shown in FIG. 12A.
Figure 13B:
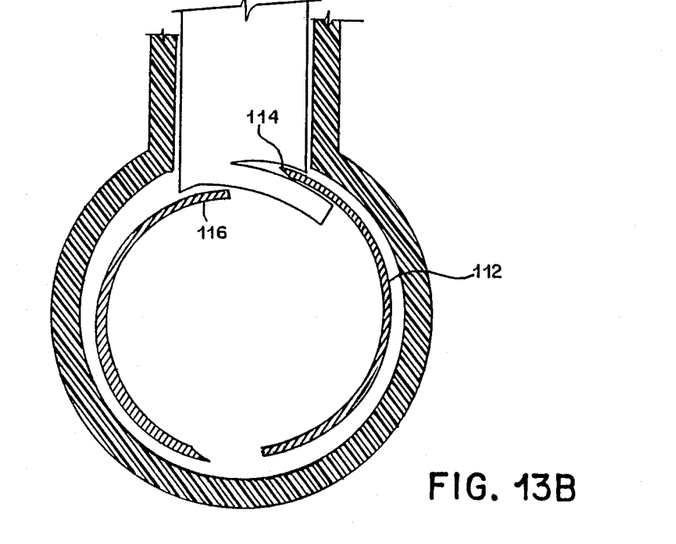
Figure 13C:
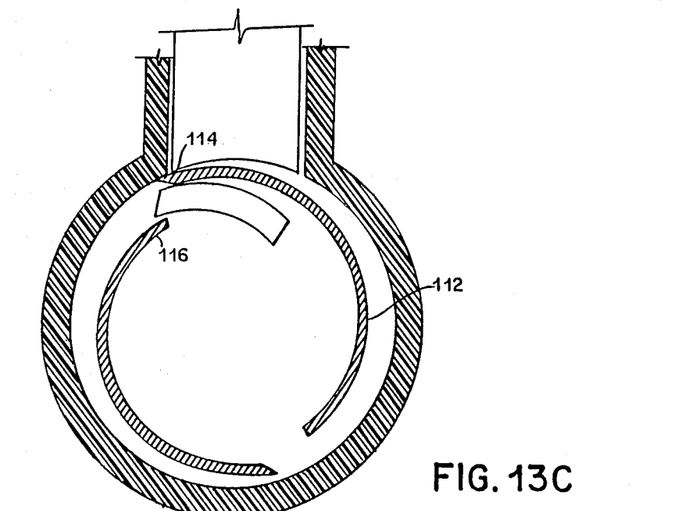

Referring to FIGS. 13A-13C, the cutting edge 114 engages one side of the uncut food which is in the food cutting position within the chute 94. Once the initial cut is made the partially cut food makes an unimpeded pass along the interior surface of the blade section 112 thereby minimizing friction during the cut and requiring less power.

Figure 14A:
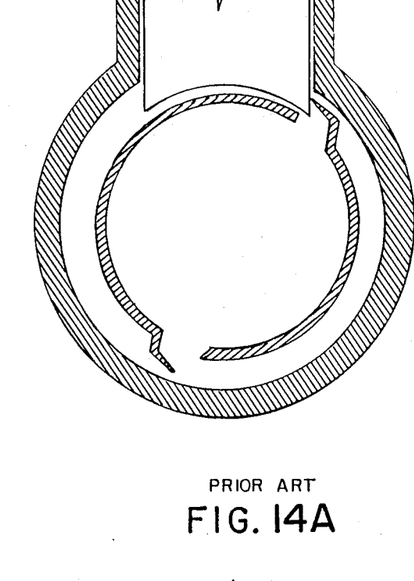
FIGS. 14A through 14C are cross-sectional views showing in sequence how a food product is sliced using a known cutting device.
Figure 14B:
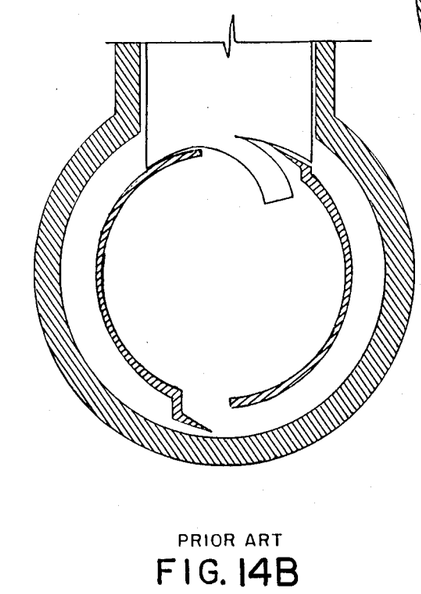
Figure 14C:
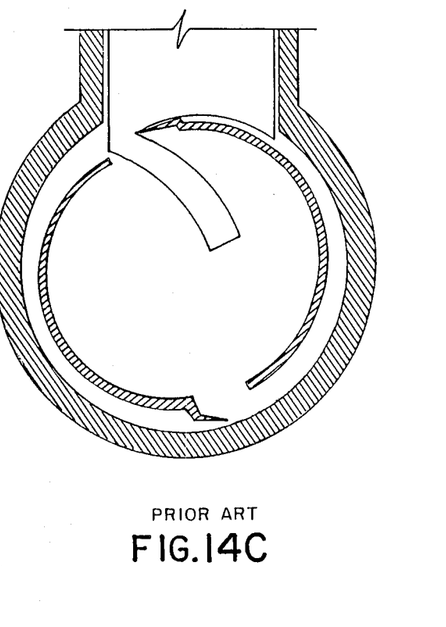

In contradistinction, prior art cutting devices shown in FIGS. 14A to 14B have non-eccentric blade sections. Only the cutting edge is raised and not the entire blade section. As a result, the top of the cut food product is forced downward as it contacts the rear portion of the cutting edge causing pressure at the cutting point (see specifically FIGS. 14B and 14C). The pressure may be of sufficient magnitude to cause the food to deform, fracture or split before the blade makes a complete pass, as well as increasing friction and requiring more power.

In use the food processor 8 is removed from the case 4, the collar 65 is removed and the desired cutting device 12 (e.g. the device of FIG. 9) is inserted into the chamber 60. The collar 65 is secured to the front of the chamber 60 causing the cutting device 12 to engage the hub 82 for rotation by the power supply means 54. Holding the food processor 8 with one hand and depressing the switch 56 activates the cutting device 12. Food may be placed in the chute 94 with the other hand and delivered to the device 12 for slicing, cutting etc., whereupon the slices tumble into the interior of the device 12 and exit from the forward end 66 of the chamber 60. When the desired amount of the food has been sliced, the switch 56 is released.

Replacing the device 12 (FIG. 9) with another device 12 (e.g FIG. 12B) is accomplished by removing the collar 65 and changing devices 12. Cleaning can be accomplished by disengaging the chamber 60 and chute 94 from the housing 52 and washing such components along with one or more devices 12 which have been removed from the chamber 60.

Other features which would be apparent to those skilled in the art and not specifically recited in the disclosure are within the scope of the present invention.

Figure 11:
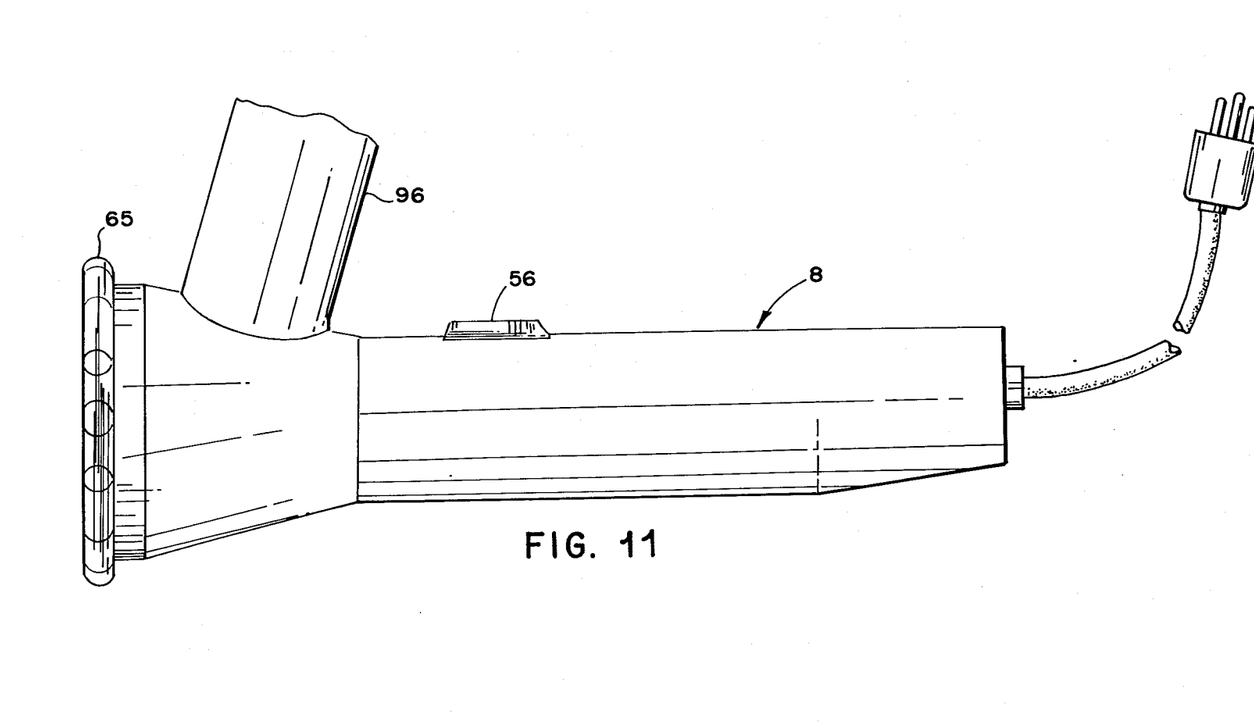
FIG. 11 is a side view of the food processor of FIG. 4 with electrical means for connection to an electrical outlet.

For example, the food processor 8 may be adapted for use without rechargeable batteries by replacing the batteries with an electrical connection between an outlet cord and the motor. Such a device would have the appearance of the food processor 8 shown in FIG. 11.

In addition, the switch 56 may be placed in any location of the housing 52, preferably in a place easily accessible to the user's fingers.

What we claim is:

1. A food processor for cutting, slicing, shredding or grating and for discharging excised food from the front thereof, comprising:
   (a) a housing including two portions;
   (b) one portion of said housing containing an electrical power supply and an actuator for said power supply, and wherein said one portion is adapted to be held and supported by the hand of the user for positioning the food processor in various orientations during operation thereof;
   (c) a conically shaped hollow second portion of said housing into which food is fed and from which excised food is discharged having a smaller rearward open end rotatably and releasably connected to said first portion of said housing, and having a larger forward open end at the front of the food processor for the discharge of excised food;

(d) a rotatable hollow conical food cutter positionable in said second portion of said housing for cutting, slicing, shredding or grating food fed into said second conical portion and through which excised food passes having a smaller rearward at said rearward smaller end of said second portion for operative rotational engagement with said power supply without being secured thereto and for ready release and removal of said food cutter from said second conical portion, and having a larger forward open end for the discharge of excised food from said forward end of said second portion;

(e) a chute intermediate said open ends of said second conical portion of said housing and extending from and above said second portion through which food is fed into said food cutter, whereupon the food is excised by and passed into and through said food cutter and is discharged from the open forward ends of said food cutter and said second conical portion at the front of the food processor; and (f) a collar operatively connected to said larger end of said second conical portion of said housing movable into and out of contact with said food cutter for releasably retaining said food cutter in operative engagement with said power supply and within said second portion.

2. The food processor of claim 1, wherein said rotatable food cutting means comprises at least one arcuate cutting edge and one arcuate guiding edge spaced from said cutting edge and comprising a cutting zone therebetween for the passage of excised food.

3. The food processor of claim 1, wherein said rotatable food cutting means comprises a plurality of arcuate blade sections which are spaced apart from each other, wherein each blade section has a trailing guiding edge and a leading cutting edge, and wherein a trailing guiding edge of one blade section and a leading cutting edge of an adjacent blade section comprises a cutting zone therebetween through which excised food passes.

4. The food processor of claim 3, wherein said blade sections are eccentrically positioned about the axis of rotation of said food cutting means.

5. The food processor of claim 3, wherein at least two of said cutting zones have different dimensions for producing excised food of different thicknesses.

6. The processor of claim 3, wherein the cutting edge of at least one blade section has an irregular shape.

7. The food processor of claim 3, wherein said arcuate blade sections extend about the perimeter and between the ends of said food cutting means.

8. The food processor of claim 1, wherein said processor comprises a plurality of food cutting means with different cutting means for cutting, slicing, shredding or grating, and wherein each of said food cutting means is adapted to be removably inserted and contained in said second portion of said housing.

9. The food processor of claim 1, wherein said food delivery means is an open chute fixedly secured to and extending directly from said second portion of said housing.

10. The food processor of claim 1, further comprising a collar releasably connected to said second portion of said housing which includes a bearing means in contact with the discharge end of said cutting means for releasably retaining said cutting means in operative engagement with said power supply while positioned within said second portion, and an unobstructed open center portion through which excised food exits from the food processor, and wherein said collar is adapted to be released from said second portion to cause disengagement of said food cutting means from said power supply and to allow the removal thereof from second portion of said housing.

11. The food processor of claim 1, wherein said power supply means comprises:

(a) a source of electrical power within or connected to said first portion;

(b) rotatable motor means operatively connected to said source of electrical power for converting electrical to mechanical energy; and (c) means operatively connected to said rotatable motor means and adapted to engage and rotate said food cutting means for cutting, slicing, shredding or grating.

12. The food processor of claim 11, further comprising means for reducing the rate of rotation of said rotatable means.

13. The food processor of claim 11, wherein the source of electrical power is at least one battery.

14. The food processor of claim 1, wherein the food processor is cordless and said power supply means are operated by rechargeable battery means.

15. A cordless, hand-holdable food processor for cutting, slicing, shredding or grating and for discharging excised food from the front end thereof, comprising:

(a) a housing including two portions;

(b) one portion of said housing containing a rechargeable battery operated rotatable power supply and an actuator for operating said power supply;

(c) a conically shaped hollow second portion of said housing into which food is fed and from which excised food is discharged having a smaller rearward open end rotatably and releasably connected to said first portion of said housing, and having a larger forward open end at the front of the food processor for the discharge of excised food;

(d) a rotatable hollow conical food cutter positionable in said second conical portion of said housing for cutting, slicing, shredding or grating food fed into said second portion and through which excised food passes having a smaller rearward end at said rearward smaller end of said second portion for operative rotational engagement with said power supply without being secured thereto and for ready release and removal of said food cutter from said second conical portion, and having a larger forward open end at and for the discharge of excised food from said forward end of said second portion;

(e) an open ended chute intermediate said open ends of said second conical portion of said housing integral with and extending from and above said second portion, and through which food is fed into said food cutter, whereupon the food is excised by and passed into and through said food cutter and is discharged from the open forward ends of said food cutter and said second conical portion at the front of the food processor; and (f) a collar operatively connected to the larger end of said second conical portion of said housing movable into and out of contact with said food cutter for releasably retaining said food cutter in operative engagement with said power supply and within said second conical portion.

16. The food processor of claims 1 or 15, wherein said rotatable food cutting means includes at least two arcuate blade sections which are spaced apart from each other and extend about the perimeter and between the ends of said food cutting means, and which are essentially positioned about the axis of rotation of said food cutting means to thereby facilitate the excising of food, wherein each blade section has a trailing guiding edge and a leading cutting edge, and wherein a trailing guiding edge of one section and a leading cutting edge of an adjacent blade section comprises a cutting zone therebetween which substantially corresponds to the thickness of the excised food and through which excised food passes.

17. The food processor of claim 16, wherein said second portion of said housing and said rotatable food cutting means have complementary conical shapes.

18. The food processor of claim 16, comprising a plurality of said food cutting means with different cutting means for cutting, slicing, shredding or grating, and wherein said food cutting means are interchangeable.

19. The food processor of claims 1 or 15, further comprising plunger means insertable in said open chute to facilitate the feeding of food to said food cutting means.

20. The food processor of claims 1 or 15, further comprising a pre-cutter for sectioning bulky food prior to feeding the food into said food delivery means.

21. The food processor of claim 20, wherein said precutter comprises a frame including a plurality of spaced apart cutting edges which form a plurality of open chambers therebetween having maximum cross sectional dimensions which are less than the breadth of said food delivery means, and wherein said cutting edges are adapted to cut through the bulky food dividing the food into sections for feeding into said food delivery means.

* * * * *